Figure 1:
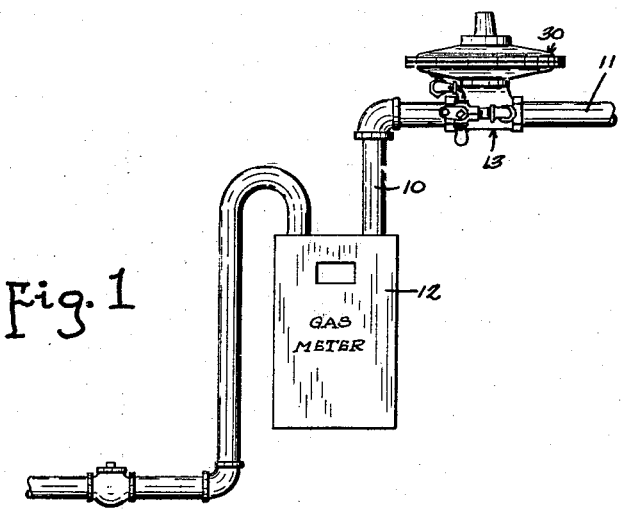

April 29, 1930.  C. L. BRYANT  1,756,340
LOW PRESSURE CUT-OFF
Filed Feb. 1, 1928   2 Sheets-Sheet 1

Charles L. Bryant
Inventor
by Smith and Freeman
Attorneys

April 29, 1930.  C. L. BRYANT  1,756,340
LOW PRESSURE CUT-OFF
Filed Feb. 1, 1928  2 Sheets-Sheet 2
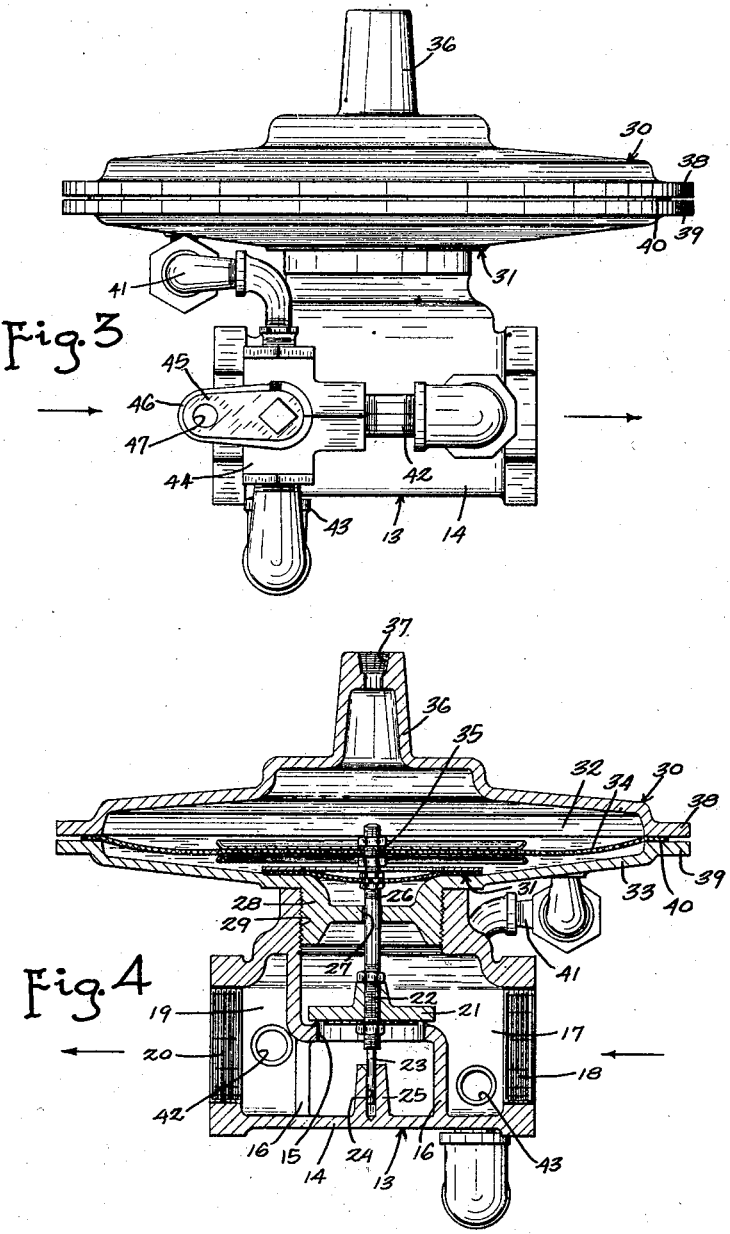
Charles L. Bryant
Inventor
by Smith and Freeman
Attorneys Patented Apr. 29, 1930

1,756,340

UNITED STATES PATENT OFFICE

CHARLES L. BRYANT, OF CLEVELAND, OHIO

LOW-PRESSURE CUT-OFF

Application filed February 1, 1928. Serial No. 251,062.

Figure 2:
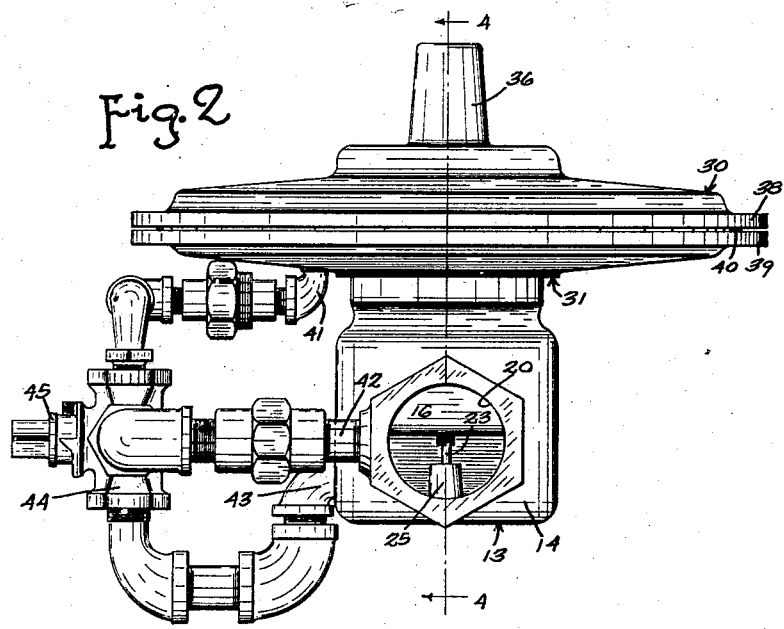

My invention relates to low pressure cut-offs, particularly to mechanism for cutting off the supply of gas when the pressure fails and then maintaining the supply cut-off until it is cut on by a deliberate manual act, and the principal object of my invention is to provide new and improved mechanism to accomplish this purpose. In the drawings accompanying this specification and forming a part of this application I have shown, for purposes of illustration, one form which my invention may assume, and in these drawings:

Figure 1 is a schematic view showing one form which my invention may assume, and one manner in which this form of my invention may be employed, Figure 2 is an enlarged view of this form of my invention looking from the right in Figure 1, Figure 3 is a similarly enlarged view looking from the front in Figure 1, while Figure 4 is a section on the line 4—4 of Figure 2.

The embodiment of my invention herein shown is inserted in the gas supply line 10 preferably beyond or on the consumer's side of the gas meter 12 and controlling the consumer's supply line 11, and this embodiment of my invention comprises a valve 13 having a valve casing 14 provided with a valve seat 15 supported by partition walls 16 dividing the space within the valve casing 14 into an inlet chamber 17 communicating with an inlet opening 18 in one end of the casing 14 and an outlet chamber 19 communicating with an outlet opening 20 in the other end of the casing 14. Cooperating with the valve seat 15 is a reciprocating valve disc 21 carried by a valve stem 22 having its lower end 23 reciprocably mounted in a recess 24 in a boss 25 projecting inwardly from the valve casing 14 into the outlet chamber 19, and having its upper end 26 reciprocably mounted in an aperture 27 formed in a plug 28 screw threadedly received within an opening 29 in the upper face of the valve casing 14.

Obviously when the valve disc 21 is in position against the valve seat 15 the supply of gas to the line 11 will be cut off at the valve 13, and when the valve disc 21 is raised from the valve seat 15 gas will flow through the valve 13 into the line 11.

Controlling the valve stem 22, and therefore the valve disc 21 and the valve 13, is a diaphragm motor 30 having the fixed wall 31 of its chamber 32 formed by the plug 28 and by an annular integral continuation 33 of the plug 28, having the movable wall of its chamber 32 formed by a flexible diaphragm 34 secured centrally at 35 to the upper end of the valve stem 22, and having its diaphragm 34 protected and secured in place by means of a cover plate 36 provided centrally with a vent aperture 37 and secured at its periphery 38 to the periphery 39 of the fixed wall 31 with the periphery 40 of the diaphragm 34 clamped therebetween, the two peripheries 38 and 39 being secured together in any suitable manner, as by bolts, not shown.

Obviously with this construction the diaphragm motor 30 is the only means for opening the valve 13; also with this construction the weight of the diaphragm 34 will in itself tend to and be sufficient to close the valve 13 in the absence of pressure in the diaphragm chamber 32 reasonably greater than the atmospheric pressure present on the upper side of the diaphragm 34 because of the opening 37 in the cover plate 36.

Leading to the diaphragm chamber 32 is a motor duct 41, leading from the outlet chamber 19 is a normal duct 42, and leading from the inlet chamber 17 is a starting duct 43, and connecting these three ducts 41 and 42 and 43 is a control valve 44 provided with an operating handle 45, shown in Figure 3 in normal position with the handle 45 alined with a lug 46 projecting from the body of the control valve 44 and the normal duct 42 leading from the outlet chamber 19 connected to the motor duct 41 leading to the diaphragm chamber 32, and movable into a starting position at right angles to the normal position shown in Figure 3 and in which the handle 45 extends vertically downward and the starting duct 43 leading from the inlet chamber 17 is connected to the motor duct 41 leading to the diaphragm chamber 32.

In operating, and starting with the valve 13 closed, the control valve handle 45 is moved into its vertical position to connect the starting duct 43 to the motor duct 41 thus to connect the inlet chamber 17 to the diaphragm chamber 32 to supply fluid to the diaphragm chamber 32 regardless of the fact that the closure of the valve 13 has cut off the fluid pressure from the outlet chamber 19 and the line 11. The resulting pressure in the diaphragm chamber 32 of course raises the diaphragm 34 to raise the valve disc 21 to open the valve 13 and admit fluid into the outlet chamber 19 and the line 11, whereupon the control valve handle 45 is returned to its normal or horizontal position wherein the control valve 44 connects the normal duct 42 to the motor duct 41, and the diaphragm chamber 32 to the outlet chamber 19 of the valve 13, and the diaphragm 34 remains in raised position because after the opening of the valve 13 there exists in the outlet chamber 19 of the valve 13 substantially the same pressure as in the inlet chamber 17 of the valve 13 and in any event sufficient pressure to maintain the diaphragm 34 raised and the valve 13 open. On the other hand, should the pressure fail there will no longer be anything to maintain the diaphragm 34 raised, and the diaphragm 34 and valve disc 21 will fall under their own weight to close the valve 13, and recurrence of the pressure will not be effective to automatically reopen the valve 13 since the closure of the valve 13 will prevent the recurring pressure reaching the outlet chamber 19 of the valve 13 and therefore prevent the recurring pressure reaching the diaphagm chamber 32, that is until the control valve 44 is shifted to vertical starting position.

Under these circumstances it will be obvious to those skilled in the art that reopening of the valve 13 after a failure in pressure requires a deliberate manual act, and accordingly that gas will not again be supplied to the line 11 until the failure has come to the attention of someone and this deliberate manual act has been performed, wherefore there is eliminated the possibility of asphyxiation because of the escape of gas from burners open at the time of the failure of pressure and not closed prior to the renewal of the supply of gas because the failure had passed unnoticed by the consumer.

Those skilled in the art also will realize that if desired the safety precautions may even be carried to the extent of locking the control valve 44 in its normal position by means of a padlock passed through the apertures 47 in the control valve handle 45 and the control valve casing lug 46 making it impossible for the gas to be turned on again by anyone except an authorized person having a key to the padlock.

Under these circumstances those skilled in the art will realize that the embodiment of my invention herein shown and described provides a new and improved low pressure cut-off, and therefore that this embodiment of my invention accomplishes at least the principal object of my invention, yet at the same time those skilled in the art will realize also that the particular embodiment of my invention herein shown and described embodies advantages other than those specifically pointed out or suggested herein, and also that this particular embodiment of my invention may be variously changed and modified without sacrificing these advantages or departing from the spirit of my invention, wherefore it will be understood that the disclosure herein is illustrative only, and that my invention is not limited thereto.

I claim:

1. A low-pressure cut-off, comprising: a valve, biased to closed position; a motor, connected to said valve to open said valve; a motor duct, leading to said motor; a normal duct, leading from the line beyond said valve; a starting duct, leading from the line ahead of said valve; and a control valve, normally connecting said normal duct to said motor duct, but shiftable to connect said starting duct to said motor duct.

2. A low-pressure cut-off, comprising: a valve; a diaphragm motor, having its chamber below the diaphragm, biasing said valve to closed position by the weight of said diaphragm, and connected to said valve to open said valve; a motor duct, leading to said diaphragm motor chamber; a normal duct, leading from the line beyond said valve; a starting duct, leading from the line ahead of said valve; and a control valve, normally connecting said normal duct to said motor duct, but shiftable to connect said starting duct to said motor duct.

3. A low-pressure cut-off, comprising: a valve, biased to closed position; a motor, connected to said valve to open said valve, and forming the only means for opening said valve; a motor duct, leading to said motor; a normal duct, leading from the line beyond said valve; a starting duct, leading from the line ahead of said valve; and a control valve, normally connecting said normal duct to said motor duct, but shiftable to connect said starting duct to said motor duct.

4. A low-pressure cut-off, comprising: a valve; a diaphragm motor, having its chamber below the diaphragm, biasing said valve to closed position by the weight of said diaphragm, connected to said valve to open said valve, and forming the only means for opening said valve; a motor duct, leading to said diaphragm motor; a normal duct, leading from the line beyond said valve; a starting duct, leading from the line ahead of said valve; and a control valve, normally connecting said normal duct to said motor duct, but shiftable to connect said starting duct to said motor duct.

5. A low-pressure cut-off, comprising: a valve, biased to closed position; a motor, connected to said valve to open said valve; a motor duct, leading to said motor; a normal duct, leading from the line beyond said valve; a starting duct, leading from the line ahead of said valve; and a control valve, normally connecting said normal duct to said motor duct, shiftable to connect said starting duct to said motor duct, and formed to be locked in normal position.

6. A low-pressure cut-off, comprising: a valve, biased to closed position; a motor, connected to said valve to open said valve, and forming the only means for opening said valve; a motor duct, leading to said motor; a normal duct, leading from the line beyond said valve; a starting duct, leading from the line ahead of said valve; and a control valve, normally connecting said normal duct to said motor duct, shiftable to connect said starting duct to said motor duct, and formed to be locked in normal position.

In testimony whereof I hereunto affix my signature.

CHARLES L. BRYANT.